United States Patent [19]

Nemecek

[11] 4,341,487
[45] Jul. 27, 1982

[54] CONNECTOR

[76] Inventor: Borivoj Nemecek, 100 Kitchener Ave., Kensington, Johannesburg 2094, Transvaal, South Africa

[21] Appl. No.: 934,264

[22] Filed: Aug. 16, 1978

[51] Int. Cl.³ .............................................. E04B 1/48
[52] U.S. Cl. ................................................... 403/297
[58] Field of Search .............. 403/292, 297, 298, 153; 85/84, 85, 8.3

[56] References Cited

U.S. PATENT DOCUMENTS

| 1,477,622 | 12/1923 | Aab | 403/153 |
|---|---|---|---|
| 1,555,242 | 9/1925 | Foster | 403/297 |
| 2,100,873 | 11/1937 | Roberts | 85/84 |
| 2,384,918 | 9/1945 | Houk | 403/297 X |
| 2,648,247 | 8/1953 | Schmuziger | 85/8.3 |
| 2,701,153 | 2/1955 | Smithers | 403/297 |
| 2,709,389 | 5/1955 | Van der Kleij | 85/8.5 |
| 3,024,326 | 3/1962 | Wischhusen | 85/8.3 |
| 3,227,030 | 1/1966 | Preziosi et al. | 85/8.3 |
| 3,883,258 | 5/1975 | Hewson | 403/292 X |
| 3,954,345 | 5/1976 | Morris | 403/297 |

FOREIGN PATENT DOCUMENTS

| 559858 | 7/1958 | Canada | 85/8.3 |
|---|---|---|---|
| 597192 | 5/1960 | Canada | 403/297 |
| 956551 | 1/1957 | Fed. Rep. of Germany | 403/153 |
| 1400836 | 1/1969 | Fed. Rep. of Germany | 85/8.3 |
| 1045292 | 6/1953 | France | 403/297 |
| 1028664 | 5/1966 | United Kingdom | 85/84 |

Primary Examiner—Andrew V. Kundrat
Attorney, Agent, or Firm—Young & Thompson

[57] ABSTRACT

The invention provides a dowel connector which comprises a tubular body of resilient material having a longitudinal slot in the wall of the body, the slot extending the entire length of the body, and the opposed faces of the slot being spaced apart. When the dowel is compressed to bring the opposed faces of the slot together, for example by urging the dowel into a bore of smaller diameter, the dowel is placed in tension tending to separate the opposed faces. The invention also envisages the provision of a rod member which is receivable in the bore of the body in its unstressed state. In one arrangement the rod member may be integral with the tubular body.

3 Claims, 10 Drawing Figures

CONNECTOR

This invention relates to connectors. More particularly the invention is concerned with dowel type connectors preferably but not necessarily made of plastic material.

According to the invention dowel connector means comprises a tubular body having a longitudinal slot in the wall extending from end to end thereof so that the opposed faces of the slot in the body are spaced apart, the body being composed of a resilient material so that when it is compressed to bring the said opposed faces together the body is placed in tension tending to separate the said faces.

Further according to the invention the dowel includes a rod member slidably receivable in the bore of the body in its unstressed state.

Thus in use two workpieces to be connected are provided with holes of a diameter somewhat smaller than that of the tubular body in its unstressed state. The tubular body is then compressed by pinching the opposed wall faces together so that its diameter in this stressed state is smaller than that of the holes and the body is then inserted into one of the holes. The latter are each a little longer than half the length of the body so that if the body is thrust to the end of the hole approximately half its length protrudes. When the body is released the tension therein causes it to expand and grip the wall of the hole. The rod is then inserted a short distance into the bore of the body whereafter the body is inserted into the hole of the other workpiece so that the rod engages the base of the hole therein and when the workpieces are pushed hard together the rod enters the bore of the body and locks the latter against the surfaces of the holes in each workpiece. In other words the dowel becomes wedged in the holes of the workpieces thus holding them together firmly.

Preferably the tubular body is made of a plastic material such as polypropylene or nylon. The rod insert on the other hand may be made of metal or plastic.

In an alternative form of the dowel according to the invention the tubular body incorporates an integral rod member in the bore thereof. For example the bore may be concavo-convex with the concave face directed away from the slot.

Preferably the dowel includes grooves, serrations, pins or the like holding formations on at least portion of the outer surface thereof. Preferably also such formations are provided at or towards both end zones of the dowel.

Further according to the invention the holding formations are designed so as not to impede movement of the dowel during insertion thereof into a hole but impede withdrawal thereof from the hole. Thus for example where the holding formations are grooves these when viewed in longitudinal section may be in the form of barbs directed away from the dowel end.

In order to illustrate the invention an example will now be described with reference to the accompanying drawings in which.

Figure 1:
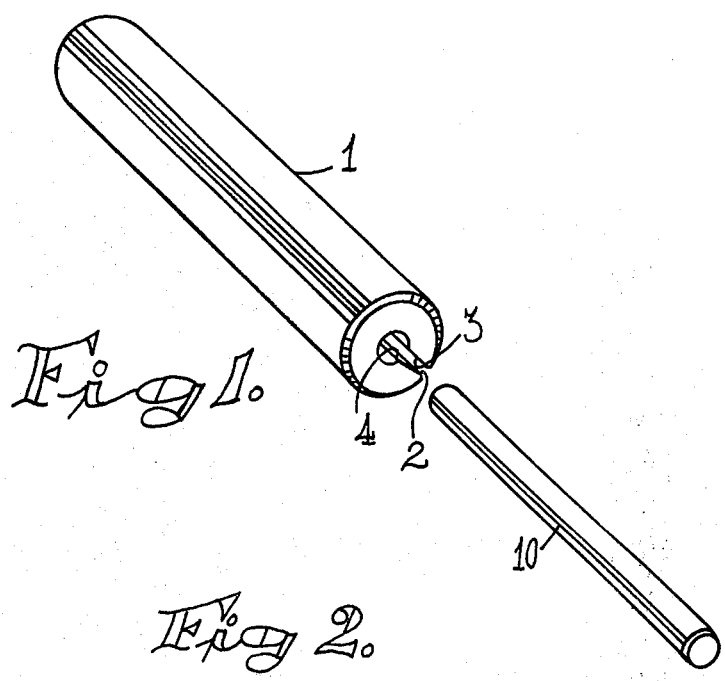
FIG. 1 is a perspective view of a dowel according to the invention.
Figure 2:
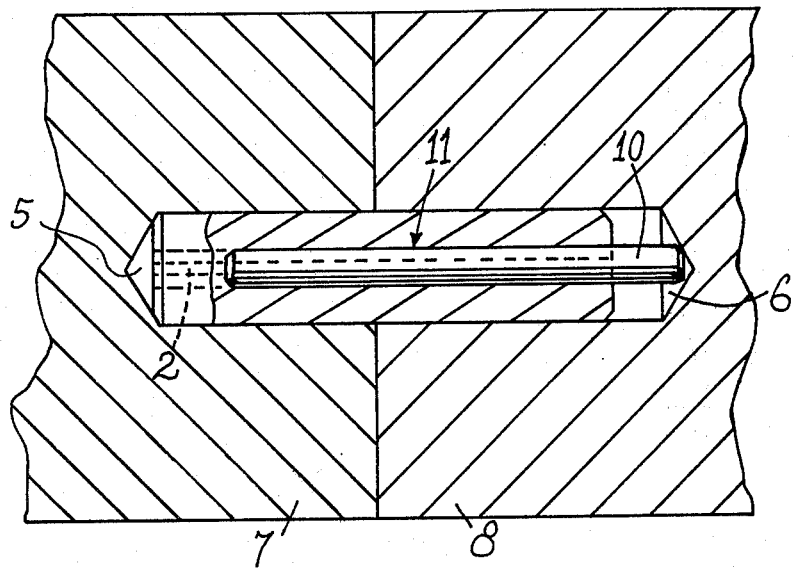
FIG. 2 is a section through the dowel showing the manner in which the dowel connects two workpieces.

Referring to FIGS. 1 and 2 of the drawings, one embodiment of the dowel of the invention comprises a tubular body 1 having a longitudinal slot 2 in the wall thereof extending from one end to the other of the body so that opposed walls of the slot are spaced apart. The body is composed of nylon so that when it is compressed to bring the said walls 3 and 4 together the body is placed in tension tending to separate the walls and form the gap once more.

The body is intended for use in conjunction with drillholes 5 and 6 in workpieces 7 and 8 respectively which drillholes have a slightly smaller diameter than that of the tubular body in its unstressed state.

The dowel is used by pinching the wall faces 3 and 4 together thereby reducing the diameter of the body to one which is slightly smaller than the drillholes 5 and 6 and inserting the dowel in this state into the hole 5. A metal rod 10 is then inserted a short distance into the bore 11 of the body 1. This metal rod is of slightly larger diameter than that of the bore 11 when the body is compressed to a slightly smaller diameter than that of the holes 5 and 6.

The other workpiece is then forced over the projecting end of the tubular body until the faces of the workpieces are brought into abutment. In doing so the projecting end of the rod 12 engages the base of the hole 6 in workpiece 8 and is forced into the bore of the tubular body thus expanding the latter to an extent that it grips the walls of the holes 5 and 6 and holds the workpieces 7 and 8 securely together.

Figure 3:
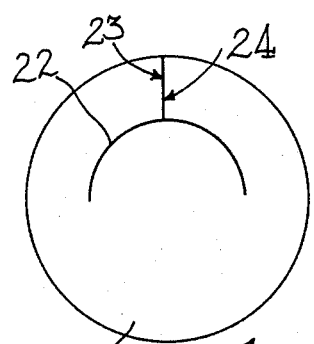
FIGS. 3, 5 and 7 are sections through the dowels of FIGS. 4, 6 and 8 respectively in a condition which they would take up in a hole in a workpiece.
Figure 4:
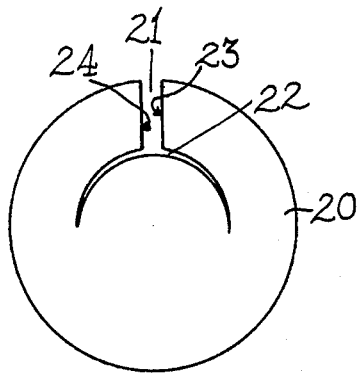
FIGS. 4, 6 and 8 are sections through three forms of dowel embodying concavo-convex bores of varying sizes.

Referring now to FIGS. 3 and 4 of the drawings, a second embodiment to the dowel of the invention comprises a tubular body 20 having a longitudinal slot 21 in the wall thereof extending from one end to the other of the body so that in the unstressed state opposed walls of the slot are spaced apart as shown in FIG. 4.

The essence of the invention in this second embodiment resides in the provision of a bore 22 which is concavo-convex in shape.

The body is composed of nylon or other tough and resilient polymeric material so that when it is compressed to bring the walls 23 and 24 together, such as by inserting a body into a hole in a workpiece, the body is placed in tension tending to separate the walls from the gap once more. In this way the dowel grips the socket walls of a workpiece and resists separation of workpieces joined together by means of the dowel.

Figure 5:
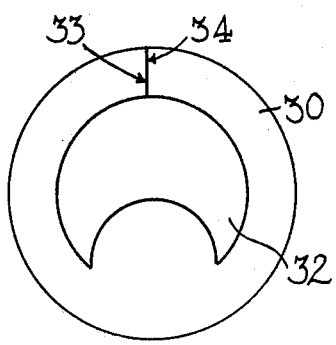
Figure 6:
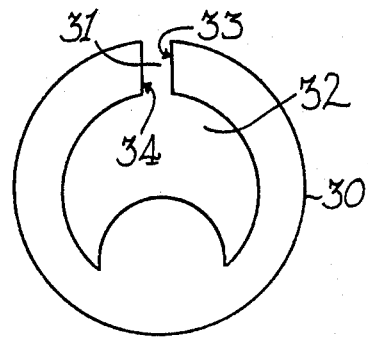

The embodiment shown in FIGS. 5 and 6 of the drawings is similar to that illustrated in FIGS. 3 and 4 with the difference that the concavo-convex bore 32 of the tubular body 30 is substantially larger than that of the bore 22 of the body 20.

Figure 7:
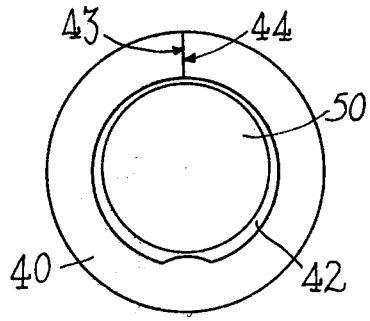
Figure 8:
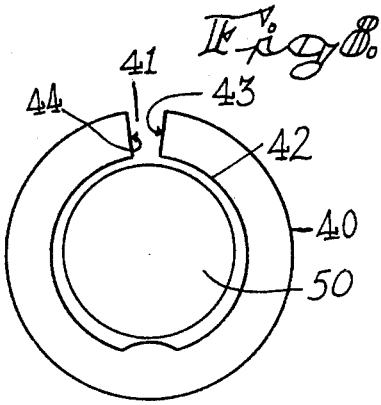

Turning now to FIGS. 7 and 8, an even more concavo-convex bore 42 of the body 40 is provided but in this embodiment a metal rod insert 50 is also utilised in the same way as that for the first embodiment of the invention as illustrated in FIGS. 1 and 2.

Figure 9:
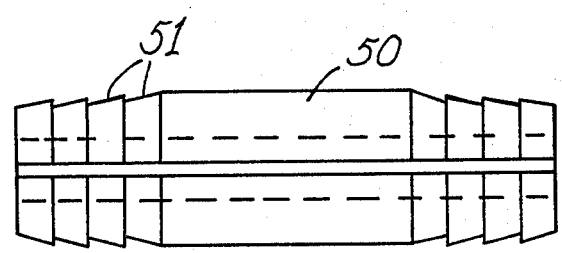
FIG. 9 is a side elevation of yet a further form of dowel.
Figure 10:
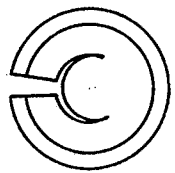
FIG. 10 is an end view of the dowel of FIG. 9.

Referring to FIGS. 9 and 10 of the drawings a dowel as described with reference to FIGS. 3 and 4 is illustrated except that in this case the dowel 50 is provided with holding formations which will ensure that the dowel remains locked once it is inserted into a hole in a workpiece. In the example illustrated grooves 51 are provided in the outer surface of the dowel 50, a plurality of such grooves being provided at each end zone of the dowel 50. The grooves 51 are angled so that in longitudinal cross-section, FIG. 9, a plurality of barbs are defined, the barbs being directed towards the centre of the dowel 50.

Clearly many variations of the invention exist and these are all envisaged as falling within the scope of this disclosure. For example the holding formations on the dowel 50 could be in the form of resilient fins which fold away from the dowel end upon insertion of the dowel to a hole. Alternatively the holding formations could be in the nature of a screw thread. Various other alternatives will be apparent.

I claim:

1. Dowel connector means comprising a body having part-cylindrical inner walls and a cylindrical outer wall coaxial with said inner walls and having a longitudinal slot therethrough extending from end to end thereof so that the opposed faces of the slot in the body are spaced apart, the body being composed of a resilient plastics material so that when it is compressed to bring the said opposed faces together the body is placed in tension tending to separate the said faces, and a part-cylindrical rod member disposed in the body, said rod member being of substantially uniform cross-sectional configuration from end to end thereof and being integral with the body on the side of the body opposite the slot, the distance between said part-cylindrical inner walls and the exterior of the part-cylindrical rod member, in the unstressed condition of the tubular body, being greatest adjacent the slot and progressively decreasing in both directions away from the slot.

2. The dowel of claim 1 including grooves, serrations, pins or the like holding formations of a portion of the outer surface thereof, said grooves, serrations, pins or the like holding formations having an outer diameter the same as that of the remainder of said outer surface.

3. The dowel of claim 2 in which such formations are provided at or towards both end zones of the dowel.

* * * * *